(12) United States Patent
Grafen (10) Patent No.: US 12,031,902 B2
(45) Date of Patent: Jul. 9, 2024

(54) METHOD FOR CONTACTLESS CHARACTERIZATION OF A SUBSTANCE

(71) Applicant: Steinfurth Mess-Systeme GmbH, Essen (DE)

(72) Inventor: Markus Grafen, Witten (DE)

(73) Assignee: Steinfurth Mess-Systeme GmbH, Essen (DE)

( * ) Notice: Subject to any disclaimer, the term of this patent is extended or adjusted under 35 U.S.C. 154(b) by 407 days.

(21) Appl. No.: 17/297,246

(22) PCT Filed: Apr. 7, 2020

(86) PCT No.: PCT/EP2020/059885
§ 371 (c)(1),
(2) Date: May 26, 2021

(87) PCT Pub. No.: WO2020/208012
PCT Pub. Date: Oct. 15, 2020

(65) Prior Publication Data
US 2022/0026349 A1  Jan. 27, 2022

(30) Foreign Application Priority Data

Apr. 11, 2019  (DE) ...................... 10 2019 109 583.2

(51) Int. Cl.
*G01N 21/27* (2006.01)
*G01N 21/3504* (2014.01)
*G01N 21/90* (2006.01)

(52) U.S. Cl.
CPC ....... *G01N 21/274* (2013.01); *G01N 21/3504* (2013.01); *G01N 21/90* (2013.01)

(58) Field of Classification Search
CPC ... G01N 21/274; G01N 21/3504; G01N 21/90
See application file for complete search history.

(56) References Cited

U.S. PATENT DOCUMENTS 5,121,337 A     6/1992  Brown
5,473,161 A  *  12/1995  Nix ................... G01N 21/3504
                                                              250/343

(Continued)

FOREIGN PATENT DOCUMENTS

EP        2108115 B1     8/2014

OTHER PUBLICATIONS

Office Action for European Application No. 20719961.3 mailed on Feb. 21, 2023, with its English translation, 10 pages.

(Continued)

*Primary Examiner* — Christine S. Kim
(74) *Attorney, Agent, or Firm* — Nicholas D. Cervenka; Bret E. Field; Bozicevic, Field & Francis LLP (57) ABSTRACT

The invention relates to a method for contactless characterization of a substance (A) using waves (W), wherein the substance (A) comprises a spectral structure ($a(\tilde{e}_i)$) as a characteristic field (KF) which qualitatively depends on at least one property ($e_i$) of the substance (A), wherein the spectral structure ($a(\tilde{e}_i)$) is recorded by a measurement (x), and wherein the measurement (x) may comprise an interference structure (s) that depends on the measurement circumstances. According to the invention it is provided that in step 1) at least two different measurements ($x_j$) are carried out under different measurement circumstances, which can have quantitatively and/or qualitatively different interference structures ($s_j$) and/or quantitatively different spectral structures ($g_j \cdot \alpha$), and that in step 2) coefficients ($c_j$) of a linear combination $$\left[\sum_{j=1}^{M} c_j x_j\right]$$

(Continued)

of the different measurements ($x_j$) and the value ($\tilde{e}_i$) of the at least one property ($e_i$) of the substance (A) are optimized so that the deviation between the linear combination $$\left( \sum_{j=1}^{M} c_j x_j \right)$$

and the spectral structure ($a(\tilde{e}_i)$) is minimized.

20 Claims, 4 Drawing Sheets

(56) References Cited

U.S. PATENT DOCUMENTS

| | | | |
|---|---|---|---|
| 6,415,233 | B1 | 7/2002 | Haaland |
| 8,707,790 | B2* | 4/2014 | Baumann ............... G01L 11/02 |
| | | | 73/705 |
| 10,041,863 | B2* | 8/2018 | Bakharev ............... G01N 7/00 |
| 10,571,351 | B2* | 2/2020 | Forestelli ............... G01M 3/38 |
| 2010/0067012 | A1* | 3/2010 | Tondello ............... G01N 21/39 |
| | | | 356/437 |

OTHER PUBLICATIONS

Office Action for European Application No. 20719961.3 mailed on Sep. 12, 2023, with its English translation, 8 pages.

\* cited by examiner

METHOD FOR CONTACTLESS CHARACTERIZATION OF A SUBSTANCE

The present invention relates to a method for contactless or non-destructive characterization and/or examination of a substance using waves, in particular electromagnetic waves, according to the preamble of the independent method claim. Furthermore, the invention relates to a corresponding measuring device according to the preamble of the independent device claim. Furthermore, the invention relates to a corresponding computer program product according to the independent product claim. Furthermore, the invention relates to a use of a corresponding measuring device according to the independent use claim.

Waves (W) modified or emitted by matter can contain information about matter. The aim of contactless measurement methods such as quantitative spectroscopy, in particular absorption spectroscopy, is to obtain certain information about matter or a particular substance by examining the waves. During the examination, the information is read from a spectral structure of the waves, which consists, for example, of the intensities at different wavelengths.

In practice it is problematic that in a measurement of the spectral structure of the waves the information and thus the known spectral structure can be mixed with further information and thus spectral interference structures, which make it difficult to read the desired information from the measurement. The interference structures can be caused, for example, by further matter in the measurement path, by interference at a container or by the source of the waves itself.

A known technical solution to the problem is the recording and processing of two measurements taken under different measurement circumstances, wherein the measurements differ, if possible, only in the specification of the desired information and wherein the information for one of the two measurements is known. Thus, with the help of mathematical methods, such as a subtraction of the two measurements, the familiar spectral structure can be isolated, from which the information can then be derived. The additional measurement with known information is also called blank, background or reference measurement. Information about the substance may involve properties such as temperature, pressure, or chemical composition, and is also referred to simply as properties in this document.

The reference measurement method is obviously only appropriate if the measurement circumstances allow only the information to be varied. Practically, this is achieved, for example, by first performing a reference measurement on an empty container, such as a cuvette without substance. The known information for this measurement is then literally "substance is not present". The substance is then added to the container and the actual measurement is performed. After processing the two measurements, e.g. by a subtraction, a spectral structure free of interference structures is available, from which the information about the filled substance can be read. In the field application of contactless measurement methods, this method is often only applicable to a limited extent, e.g. when the substance is in a sealed container and measurements therefore always contain information about the container.

To simplify the reading of information from the spectral structure, in practice a mathematical model is often available as a characteristic field, which is compared with the recorded spectral structure, e.g. using the least squares (engl: least squares, LS) method. For more difficult measurement circumstances, such as the measurement of a substance in a sealed container, there are methods such as that known from the patent specification EP 2 108 115 B1. Here, in addition to the characteristic field of the spectral structure, characteristic fields for the spectral interference structures are also modeled, which together simplify a reading of the information from the measurements. While these methods can improve the accuracy of the information read, they require accurate modeling of the interference structures. This leads to the significant disadvantage that unexpected interference structures not provided for in the characteristic field can greatly reduce the accuracy of the information read. Unexpected interference structures can occur, for example, in the non-destructive examination of a soft drink that is included in a sealed PET bottle.

It is an object of the present invention to provide an improved method for contactless and/or non-destructive characterization and/or examination of a substance using waves, in particular electromagnetic waves. In particular, it is an object of the present invention to provide a method which can be easily and conveniently carried out and which provides precise and reliable results in the characterization and/or examination of the substance. In particular, the method according to the present invention is intended to be suitable for quality control of drinks, preferably carbonated drinks, which can be included in sealed containers, in order to determine a pressure and/or a carbonic acid concentration from the drinks, preferably without destroying and/or opening the containers. Furthermore, it is an object of the present invention to provide a corresponding measuring device. Further, it is an object of the present invention to provide a corresponding computer program product.

To solve this object, a method for contactless or non-destructive characterization and/or examination of a substance using waves, in particular electromagnetic waves, with the features of the independent method claim, in particular from the characterizing portion, is proposed. Furthermore, the invention provides a corresponding measuring device with the features of the independent device claim, in particular from the characterizing portion, for solving the task. Furthermore, the invention provides for a corresponding computer program product according to the independent product claim. Furthermore, the invention provides a use of a corresponding measuring device according to the independent use claim. Preferred further embodiments of the invention are disclosed in the dependent claims. Features disclosed with respect to the individual aspects of the invention can be combined with each other in such a way that reference is or can always be made mutually with respect to the disclosure of the aspects of the invention.

The invention provides a method for contactless (with respect to the substance) or non-destructive (with respect to the container) characterization (which substance?) and/or examination (which properties does the substance have?) of a substance. The substance can, for example, be in the form of a gas, which can, for example, be present above a carbonated drink in a sealed container. The method according to the invention is carried out contactless with respect to the substance, wherein it is of course conceivable that a measuring device can touch the container. The method according to the invention is also carried out non-destructively with respect to the container, i.e. without destroying and/or opening the container. The characterization serves to determine the nature of the substance and the examination serves to determine the properties of the substance.

The method is carried out using waves, preferably electromagnetic waves. The substance comprises a spectral structure as a characteristic field, which depends qualitatively on at least one property of the substance. A property of the substance means a chemical (composition) and/or thermodynamic property (pressure, concentration).

The spectral structure of the substance is recorded by a measurement. The measurement can comprise an interference structure, which depends on the measurement circumstances. The interference structure can be caused, for example, by the shape of the container, by other substances in the measurement path, by the measurement circumstances and/or by the source of the waves. The measurement circumstances can be determined by different measurement angles and/or positions of a measuring device with respect to the container in which the substance is included, so that under different measurement circumstances the interference structure can change quantitatively and/or qualitatively and the spectral structure can change quantitatively (e.g. by changing the optical path length). The measurement circumstances cause the spectral structure of the substance to be superimposed by the interference structure in a measurement. In contrast to the spectral structure, which is available as a characteristic field, no function is known for the interference structure.

The invention provides that in step 1) at least two different measurements are carried out under different measurement circumstances, which may have quantitatively and/or qualitatively different interference structures and/or quantitatively different spectral structures, and that in step 2) coefficients of a linear combination of the different measurements and the value of the at least one property of the substance are optimized so that the deviation between the linear combination and the spectral structure is minimized.

In other words, the invention provides that in step 1) any number, but at least two different measurements are made under (deliberately) different measurement circumstances, so that the information about the substance and the information about the remaining influencing factors, i.e., the interference structures, are represented to different degrees in the individual measurements.

The invention thus proposes a method with the features of the independent method claim, in particular from the characterizing portion, with which spectral interference structures can be precisely separated from the spectral structures of the substance without their prior modeling. The method can be seen as an extension of the method of reference measurement presented above. Instead of taking exactly one reference measurement and exactly one other measurement for which partial information is available, any number of measurements, but at least two measurements, are taken under different measurement circumstances, and no information need be available for the measurements. Measurement circumstances can be, for example, measurement angles and/or measurement positions with respect to the substance. Illustratively, for this purpose, a user may pass a measuring device similar to a barcode scanner under different positions and orientations with respect to the substance, for example, in the region of a bottle head when examining a carbonated drink in a sealed container. In the measurements recorded in this way, information about the substance as well as further information, e.g., about the container, are pronounced differently in each case. Since it is unknown which measurements contain which information, it is not possible to specifically designate individual measurements for subtraction as in the reference measurement method.

Therefore, the next step of the method is to determine how the measurements can be subtracted from each other to obtain a spectral structure of the substance. The target criterion is the smallest possible deviation of the subtraction result from the characteristic field of the spectral structure. In other words, the coefficients of a linear combination of the different measurements and the read information are optimized so that the deviation between the linear combination and the spectral structure is minimized. After optimization, the read information reproduces the actual information with high accuracy.

The idea of the invention is that with increasing number of measurements the spectral structure of the substance will be distinguishable from the interference structures in the Q-dimensional vector space of the measurements, wherein Q is the number of measurement channels. In order to determine the spectral structure of the substance, a relevant subspace of the vector space in which the measurements mainly take place can first be found in step 2). The relevant subspace is at most the space spanned by the measurement vectors themselves. The approach is now to find the spectral structure of the substance in the relevant subspace using the characteristic field for the spectral structure of the substance. This is done mathematically by determining the intersection between the characteristic field of the spectral structure of the substance and the relevant subspace. For example, the intersection of the spectral structure of the substance can be determined using LS methods with the smallest distance to the relevant subspace. In this way, the spectral structure of the substance can be recovered from the measured values. If the spectral structure of the substance has been characterized or determined, the spectral structure can be used to infer the property of the substance to be determined, such as the pressure and/or the carbonic acid concentration of the substance, which may be present, for example, in the form of a carbonated drink.

In the method described above, the measurement vectors span the relevant subspace, but do not represent a useful basis for the optimization, in particular in the case of a large number of measurements. Therefore, in a method for contactless characterization of a substance, the invention can provide that in step 2), for optimizing, in particular indirectly, the coefficients of a linear combination of the measurements, coefficients of a linear combination of singular vectors are optimized, wherein the singular vectors are columns of a singular matrix, wherein the singular matrix results from a singular value decomposition of a measurement data matrix, and wherein the measurement data matrix comprises the measurements in the columns. Thus, data preparation can take place in step 2) to simplify optimization in accordance with the invention and to reduce computational resources.

Furthermore, in a method for contactless characterization of a substance, the invention may provide that the at least two different measurements are carried out at different measurement angles and/or positions with respect to the substance. Thus, the advantage can be achieved that the method can be performed easily and conveniently. For this purpose, a user can pass a measuring device similar to a barcode scanner under different positions and orientations with respect to the substance, for example in the region of a bottle head when a carbonated drink in a sealed container is examined. In contrast to known methods, in which the measuring device may not be moved for a certain time, e.g. at least for 10 s, the measuring device in the sense of the invention can be moved easily and conveniently. This appears to be an intentional noise in the measurements. However, the variance created by this, together with the method according to the invention, ultimately leads to considerably more accurate measured values than in known methods.

Further, in a method for contactless characterization of a substance, the invention may provide that the at least two different measurements are carried out at different measurement angles and/or positions with respect to a bottle head of a bottle including a carbonated drink, wherein the substance forms a content of the bottle head of the bottle above the carbonated drink in the bottle. Thus, the content of the bottle above the carbonated drink can be characterized and/or examined. A gas forms above the carbonated drink that is in thermodynamic equilibrium with the carbonated drink in the normal state or in the case of a sealed bottle. Thus, once the gas has been characterized, the pressure and/or carbonic acid concentration of the gas and consequently of the carbonated drink can be inferred. To characterize the gas, electromagnetic waves can preferably be used, which can cause the molecules of the gas to oscillate and/or rotate by absorption in the gas. The electromagnetic waves can have a wavelength between 800 nm and 16 µm, e.g. approx. 2400 nm.

Furthermore, in a method for contactless characterization of a substance, the invention may provide that in step 1) a plurality of measurements, preferably up to 80 measurements, are carried out under different measurement circumstances. In this way, the Q-dimensional vector space can be filled with up to 80 measurements by which a suitable subspace can be found to characterize the substance.

Furthermore, in a method for contactless characterization of a substance, the invention may provide that in step 1) a plurality of measurements are carried out over a period of up to 5 sec, preferably 10 sec, more preferably 20 sec. In this way, it can be ensured that a sufficient number of measurements is recorded, which in any case comprises measurements containing information about the substance.

Furthermore, in a method for contactless characterization of a substance, the invention can provide that in step 1) the at least two different measurements are carried out using electromagnetic waves having a wavelength between 800 nm and 16 µm, in particular about 2400 nm. Thus, a simple laser measuring device, for example in the form of a laser diode, can be used to carry out the method according to the invention. The approximately suitable wavelength can advantageously be selected with the characteristic field, if it is known, which substance may be involved and/or which properties the substance may have approximately. When checking the durability of a carbonated drink, for example, it is known which pressure and/or which carbon acid concentration can be assigned to a durable drink. For different values of pressure and/or carbonic acid concentration, the characteristic field shows different spectral structures for the substance. Thus, an approximately suitable wavelength can be selected to examine the substance using the method according to the invention. Finally, the correct spectral structure for the substance is found as an intersection with the relevant subspace of the measurements. The spectral structure found for the substance corresponds to a certain pressure and/or a certain concentration, which are now determined in the sense of the invention.

Furthermore, in a method for contactless characterization of a substance, the invention may provide that in step 1) the at least two different measurements are carried out using an optical method, in particular using a spectroscopic method, preferably an absorption spectroscopic method, preferably a rovibrational spectroscopic method. In particular, when characterizing a substance in the form of a carbonated drink contained in a sealed container, such a spectroscopic method can be advantageous for generating an absorption spectrum of a gas above the carbonated drink. In principle, however, it is also conceivable that the method can be carried out using acoustic waves.

Furthermore, it is conceivable that in step 1) the at least two different measurements are carried out using a laser measuring device, in particular a laser diode. A laser measuring device, in particular in the form of a laser diode, is an easy-to-use and inexpensive measuring device which can provide improved measurement results when carrying out the method according to the invention.

Furthermore, in a method for contactless characterization of a substance, the invention can provide that in step 2), for optimizing, in particular indirectly, the coefficients of a linear combination of the measurements, coefficients of a linear combination of singular vectors are optimized, wherein the singular vectors are columns of a singular matrix, wherein the singular matrix results from a singular value decomposition of a measurement data matrix, and wherein the measurement data matrix comprises the measurements in the columns. Thus, data preparation can take place in step 2) to simplify optimization in accordance with the invention and to reduce computational resources.

Moreover, in a method for contactless characterization of a substance, the invention may provide that in a step 3) the spectral structure, whose deviation from the linear combination of the different measurements is minimized, is used to determine the value of the at least one property of the substance, wherein in particular the value of the at least one property of the substance forms a pressure and/or a carbonic acid concentration of a carbonated drink. In this way, the interesting and/or essential properties of the substance can be determined. With the help of such properties, the quality, durability and/or expiration date of the substance can be determined. Thus, the method according to the invention can be carried out for quality control of food products, in particular drinks, preferably carbonated drinks.

Furthermore, in a method for contactless characterization of a substance, the invention may provide that in a step 4) a characteristic field for the spectral structure is updated using the spectral structure whose deviation from the linear combination of the different measurements is minimized. In this way, the characteristic field can always be kept up to date, which can help to improve future examinations.

Furthermore, the object according to the invention is solved by a measuring device for contactless characterization of a substance using waves, in particular electromagnetic waves. For this purpose, it is provided according to the invention that the measuring device is specially designed for carrying out the method according to the invention, which can run as described above. With the use of the measuring device according to the invention, the same advantages are achieved which were described above in connection with the method according to the invention. These advantages are fully referred to herein.

Within the scope of the invention, it is conceivable that the measuring device may comprise a computer unit which is designed to optimize the coefficients of a linear combination of the different measurements and the value of the at least one property of the substance in order to minimize the deviation between the linear combination and the spectral structure. Thus, it can be precisely determined which substance is involved.

In addition or instead, it is conceivable that the measuring device can comprise a computer unit which is designed to optimize, in particular indirectly, the coefficients of a linear combination of the measurements by optimizing coefficients of a linear combination of singular vectors, wherein the singular vectors are columns of a singular matrix, wherein the singular matrix results from a singular value decomposition of a measurement data matrix, and wherein the measurement data matrix comprises the measurements in the columns. Thus, the computing power for carrying out the method according to the invention can be reduced. At the same time, a high accuracy of the examination can thus be ensured.

Advantageously, the measuring device may comprise a display unit which is designed to display the spectral structure whose deviation from the linear combination of the different measurements is minimized and/or the determined value of the at least one property of the substance. Consequently, the operation of the measuring device can be carried out with a high comfort and almost intuitively, even by an untrained user.

Furthermore, the object according to the invention is solved by a computer program product which can be stored in a memory of a measuring device, which can be designed as described above, and which, when at least partially executed in a computer unit of the measuring device, can execute a method which can run as described above. By means of the computer program product according to the invention, the same advantages are achieved as described above in connection with the method according to the invention and/or the measuring device according to the invention. Full reference is made to these advantages herein.

The invention further provides for the use of a measuring device, which may be designed as described above, for quality control of drinks, preferably carbonated drinks, to determine a pressure and/or a carbonic acid concentration of drinks, preferably carbonated drinks. In principle, however, quality control of food products of all kinds is conceivable with the use of the measuring device according to the invention.

Further measures improving the invention are presented in more detail below with the description of preferred embodiments of the invention based on the figures. In this connection, the features mentioned in the claims and in the description may each be essential to the invention individually or in any combination. It should be noted that the figures are descriptive only and are not intended to limit the invention in any way. The figures show:

In the different figures, identical features of the invention are always provided with the same reference signs, which is why they are generally described only once.

Figure 1:
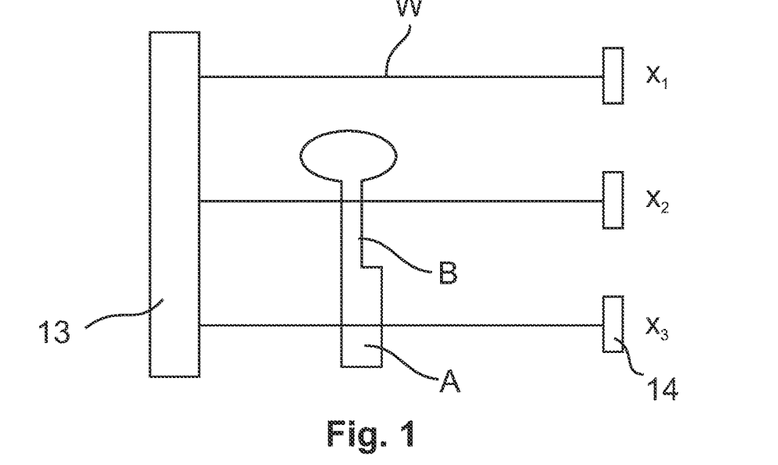
FIG. 1 a schematic design for contactless characterization of a substance using waves in the sense of the invention, FIG. 2 spectral structures obtained using the design according to FIG. 1, FIG. 3 an exemplary characteristic field for a spectral structure depending on a property of the substance, FIG. 4 a schematic design for the contactless characterization of a substance using waves according to the prior art, FIG. 5 spectral structures obtained using the design according to FIG. 4, FIG. 6 a spectral structure of the substance obtained according to the prior art as shown in FIGS. 4 and 5, FIG. 7 a schematic design for contactless characterization of a substance using waves in the sense of the invention, FIG. 8 spectral structures obtained using the design according to FIG. 7, FIG. 9 a spectral structure of the substance obtained with the use of the invention according to FIGS. 7 and 8, and FIG. 10 a schematic representation of a measuring device in the sense of the invention in a possible use case of the measuring device.

FIG. 1 shows a schematic design for contactless characterization of a substance A using waves W in the sense of the invention in an ideal case. With the use of the schematic design shown, comprising a sending element 13 and a receiving element 14, a spectral method is carried out. With the use of the spectral method, a spectral structure $a(\tilde{e}_i)$ of substance A is recorded, for example in the form of an absorption spectrum.

Figure 2:
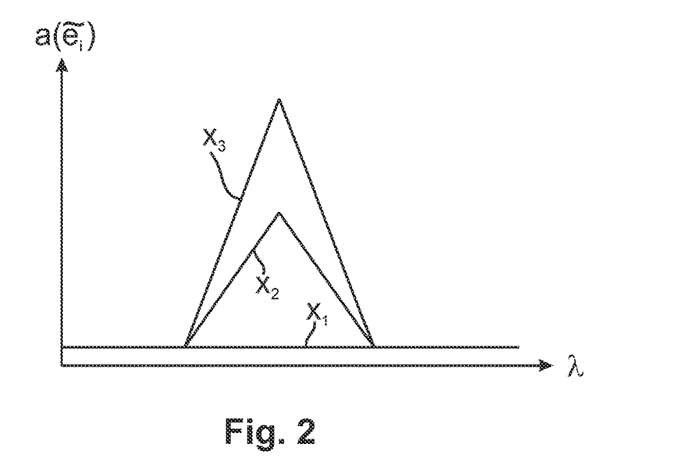

For example, FIGS. 1 and 2 show three measurements x1, x2, x3 and correspondingly three spectral structures $a(\tilde{e}_2)$, $a(\tilde{e}_2)$, $a(\tilde{e}_3)$ for the measurements x1, x2, x3 depending on a wavelength $\lambda$. The measurement x1 mostly serves as a comparison measurement for the environment of substance A.

Figure 3:
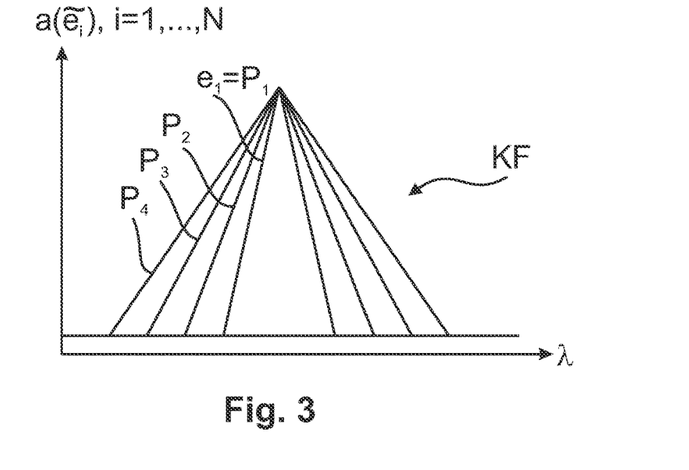

FIG. 3 also shows an exemplary characteristic field KF. FIG. 3 shows that the spectral structure $a(\tilde{e}_i)$ depends qualitatively on at least one property $e_i$ of the substance A. In order to characterize the substance A, an intersection between the measurements x1, x2, x3 and the characteristic field KF is searched. A spectral structure $a(\tilde{e}_i)$ from the characteristic field KF fits at least approximately to one of the measurements x1, x2, x3. This spectral structure $a(\tilde{e}_i)$ is selected as measurement result. This selected spectral structure $a(\tilde{e}_i)$ is also used to determine the property $e_i$ of substance A, such as the pressure e1=P1, P2 or P3.

FIGS. 1 to 3, however, show an ideal case. In the normal case, the substance, especially if it is gaseous or liquid, does not hang freely in space.

Figure 4:
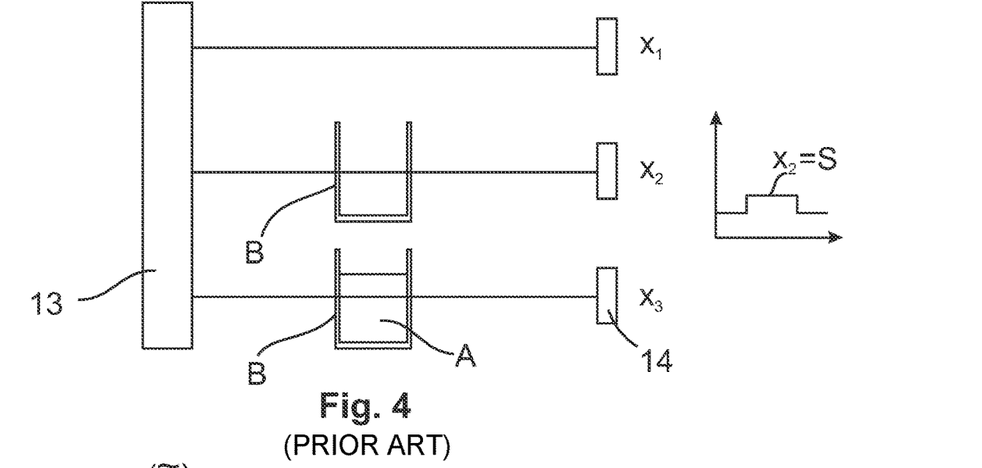

As shown in FIG. 4 on the prior art, a gaseous or liquid substance is usually included in a container B.

Figure 5:
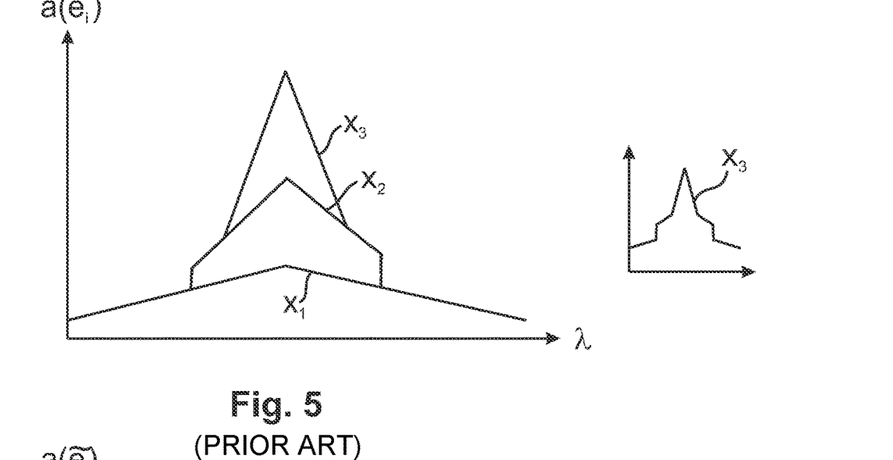

In known methods explained with the use of FIGS. 4, 5 and 6, reference or background spectra are usually recorded from the container B (see measurement x2) in which the substance A is later examined (see measurement x3). Again, a measurement x1 can serve as a reference measurement for the environment of substance A or for the source of the waves (W). The spectral structures $a(\tilde{e}_1)$, $a(\tilde{e}_2)$, $a(\tilde{e}_3)$ for the measurements x1, x2, x3 are shown in FIG. 5. Known reference or background spectra of the container B are filtered out from the actual spectrum of the substance using mathematical methods, as indicated in FIG. 6, in order to remove the influence of the container B in the examination of the substance A as a known interference structure s.

As FIG. 4 further indicates, the measurements x2 and x3 are recorded possibly under the same measurement circumstances, e.g. at the same position with respect to the container B.

Figure 6:
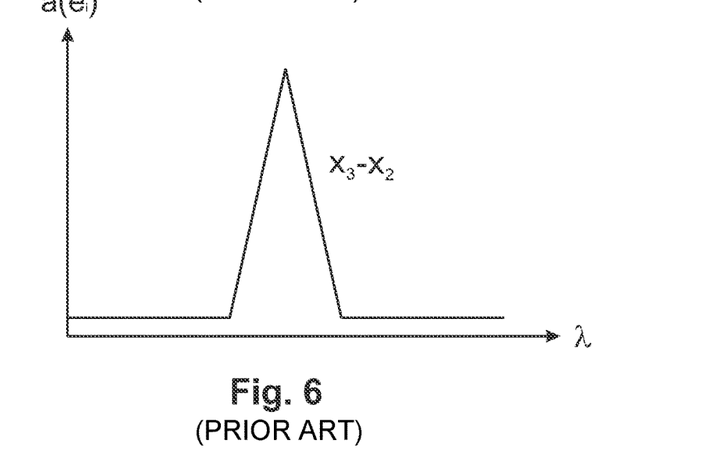

However, for many food products included in sealed containers B, such as soft drinks, such methods as shown in FIGS. 4 to 6 are not applicable. The interference structures $s_i$ are unknown in such examinations and cannot be determined without destroying the container B. The unknown interference structures $s_i$ can come from unknown container geometry, interference phenomena or effects of extraneous phases in the measurement path between the sending element 13 and the receiving element 14.

The invention provides an improved method for contactless or non-destructive characterization and/or examination of a substance A using waves W, in particular electromagnetic waves, which is explained with reference to FIGS. 7 to 9 and 10. The method according to the invention is intended to be particularly suitable for quality control of food products, such as drinks G, preferably carbonated drinks G, which may be included in sealed containers B. With the use of the method according to the invention, moreover, the pressure P and/or a carbonic acid concentration of the drinks G can be determined, preferably without destroying and/or opening the containers B (see FIG. 10).

The substance A comprises a spectral structure $a(\tilde{e}_i)$ as a characteristic field KF, which depends qualitatively on at least one property $e_i$ of the substance A, as shown above by way of example in FIG. 3.

Figure 7:
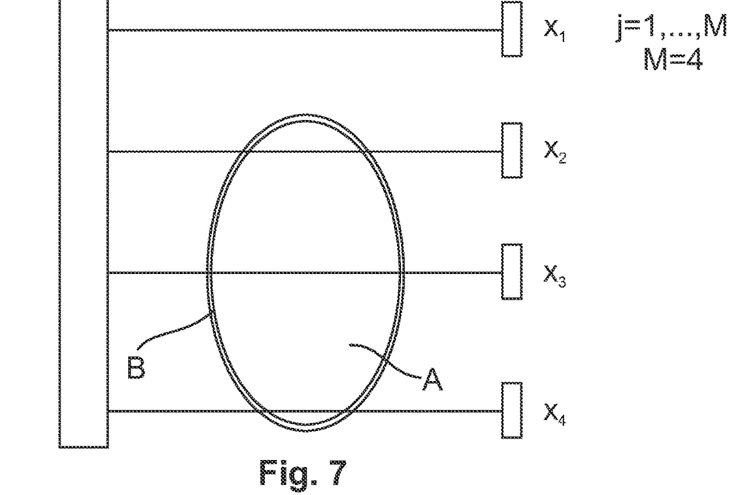
Figure 8:
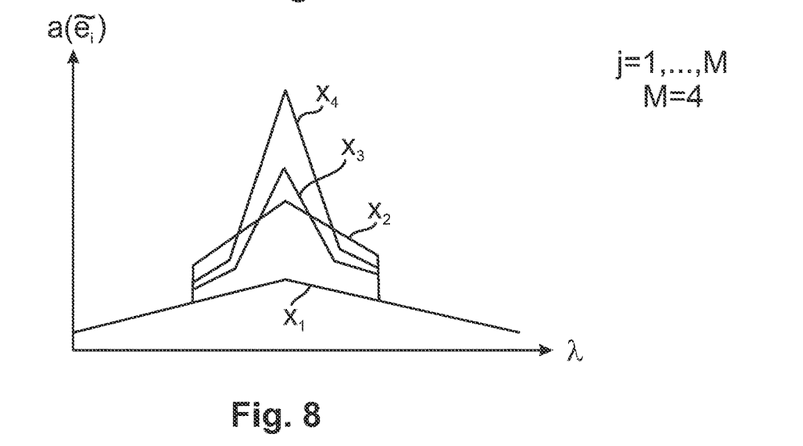

The spectral structure $a(\tilde{e}_i)$ of substance A is recorded by a measurement $x_j$ (see FIGS. 7 and 8). The measurement $x_j$ can comprise an unknown interference structure $s_j$, which depends on the measurement circumstances. Under different measurement circumstances, the interference structure $s_j$ can change quantitatively and/or qualitatively and the spectral structure $a(\tilde{e}_i)$ can change quantitatively (e.g. by changing the optical path length):

$$x_1 = g_1 \cdot \alpha + s_1,$$

$$x_2 = g_2 \cdot \alpha + s_2$$

where an exclusively quantitative change of the interference structure $s_j$ $$s_j = h_j \cdot s$$

must not be accompanied by an identically pronounced change of the spectral structure $a(\tilde{e}_i)$ (i.e. $h_j = g_j$ in each case) in X.

Qualitative change here means that:

$$\alpha(e_i) \neq e_i g \alpha_{const}.$$

Figure 9:
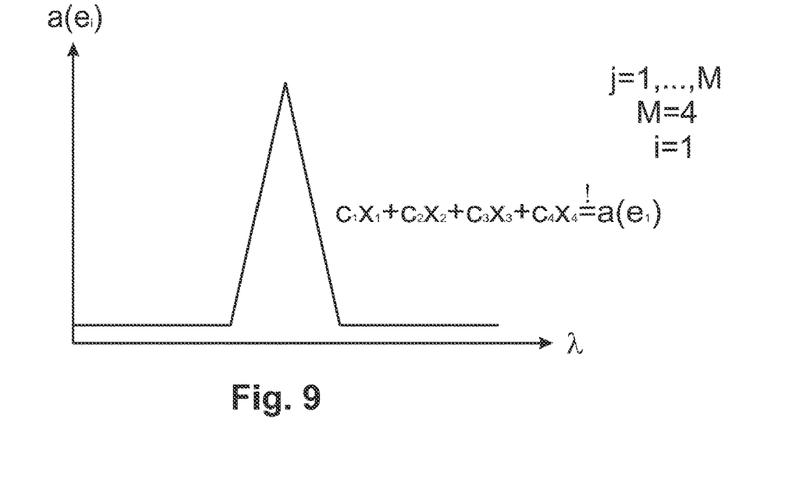

The invention provides that in step 1) at least two different measurements $x_j$ are carried out under different measurement circumstances (see FIGS. 7 and 8), which may comprise quantitatively and/or qualitatively different interference structures $s_j$ and/or quantitatively different spectral structures $a(\tilde{e}_i)$, and that in step 2) coefficients $c_j$ of a linear combination $$\sum_{j=1}^{M} c_j x_j$$

of the different measurements $x_j$ and the value $\tilde{e}_i$ of the at least one property $e_i$ of substance A are optimized so that the deviation between the linear combination $$\sum_{j=1}^{M} c_j x_j$$

and the spectral structure $a(\tilde{e}_i)$ is minimized (see FIG. 9).

As it is indicated in FIG. 7 with the help of four measurements (M=4), in step 1) any number (preferably up to 80 measurements), but at least two different measurements $x_j$ are carried out under (deliberately) different measurement circumstances. In the sense of the invention, with increasing number M of measurements $x_j$, the spectral structure $a(\tilde{e}_i)$ of substance A will be distinguishable from the interference structures $s_j$ in a Q-dimensional vector space.

In order to determine the spectral structure $a(\tilde{e}_i)$ of the substance A, in step 2) first a relevant subspace can be found in the Q-dimensional vector space V, in which the measurements $x_j$ mainly take place. The relevant subspace $V_x$ is at most the space spanned by the measurement vectors $x_j$, $j=1, \ldots, M$ itself. The approach is now to find the spectral structure $a(\tilde{e}_i)$ of substance A in the relevant subspace $V_x$ with the help of the characteristic field KF for the spectral structure $a(\tilde{e}_i)$ of substance A. This is done mathematically by determining the intersection between the spectral structure $a(\tilde{e}_i)$ of substance A and this relevant subspace $V_x$. For example, the intersection of the spectral structure $a(\tilde{e}_i)$ of substance A can be determined using LS methods with the smallest distance to the relevant subspace $V_x$. In this way, the spectral structure $a(\tilde{e}_i)$ of substance A can be recovered from the measured values. If the spectral structure $a(\tilde{e}_i)$ of substance A has been characterized, the spectral structure $a(\tilde{e}_i)$ of substance A can be used to infer the property $e_i$ of substance A to be determined, such as the pressure P and/or the carbonic acid concentration of substance A, which may be present, for example, in the form of a carbonated drink G.

In other words, in step 2), for optimizing, in particular indirectly, the coefficients $c_j$ of a linear combination $c_j x_j$ of the measurements $x_j$, coefficients $(d_h)$ of a linear combination $$\sum_{h=1}^{K} d_h u_h$$

of singular vectors $u_h$ can be optimized, wherein the singular vectors $u_h$ are columns of a singular matrix U.

$$U = \begin{pmatrix} u_{11} & \ldots & u_{K1} & \ldots & u_{M1} \\ \ldots & \ldots & \ldots & \ldots & \ldots \\ \ldots & \ldots & \ldots & \ldots & \ldots \\ u_{1Q} & \ldots & u_{KQ} & \ldots & u_{MQ} \end{pmatrix},$$

wherein the singular matrix U results from a singular value decomposition SVD ($X = U\Sigma V^T$) of a measurement data matrix X:

$$X = \begin{pmatrix} x_{11} & \ldots & x_{M1} \\ \ldots & \ldots & \ldots \\ x_{1Q} & \ldots & x_{MQ} \end{pmatrix}$$

and wherein the measurement data matrix X comprises the measurements $x_j$ in the columns.

The method according to the invention can also be used to update the KF characteristic field.

Figure 10:
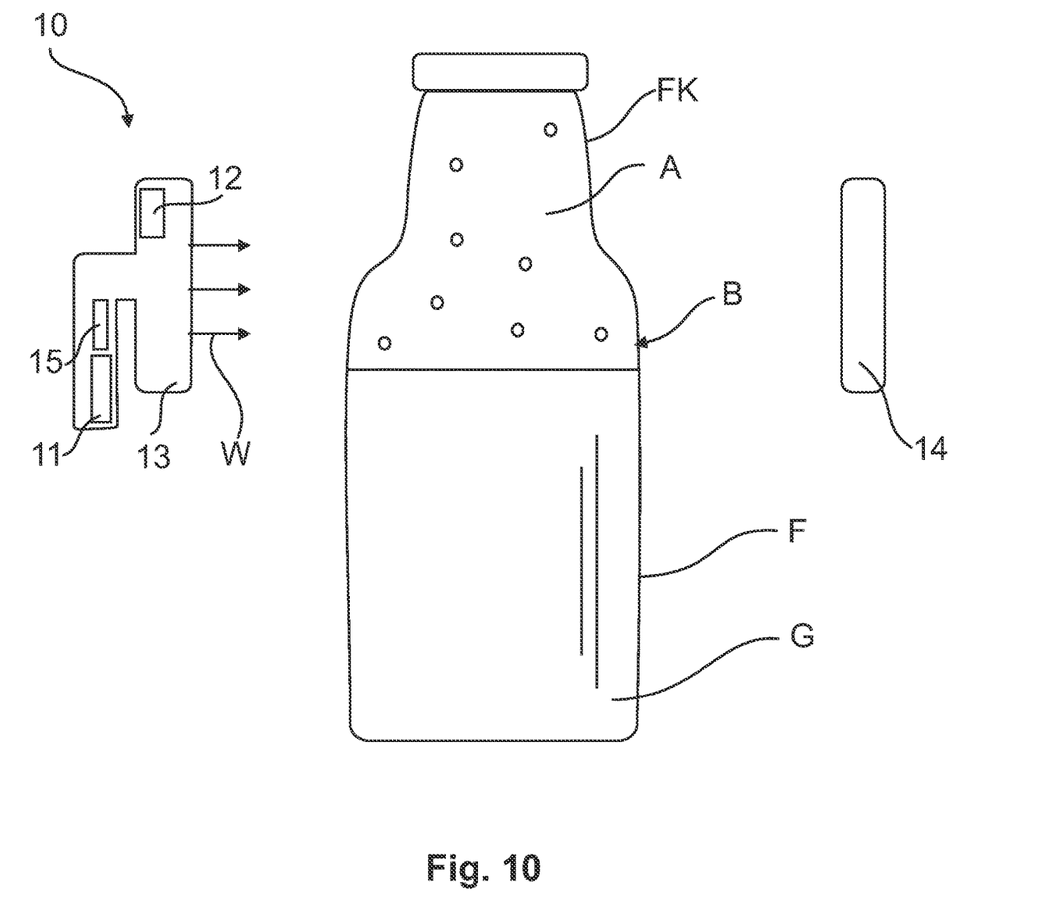

As it is further shown in FIG. 10, the at least two different measurements $x_j$ of step 1) can be carried out in the region of a bottle head FK of a bottle F including a carbonated drink G, wherein the substance A forms a content of the bottle head FK of the bottle F above the carbonated drink F in the bottle F. A gas is formed above the carbonated drink G, which is in thermodynamic equilibrium with the carbonated drink G in a normal state when the bottle F is sealed. If the gas has thus been characterized as substance A, the pressure P and/or the carbonic acid concentration of the gas and consequently of the carbonated drink G can be inferred.

FIG. 10 further shows that a user can hold or pass a measuring device 10 in the sense of the invention similar to a barcode scanner at the substance A, for example in the region of a bottle head FK, when a carbonated drink G in a sealed container B is examined. The measuring device 10 may be in the form of a laser measuring device, in particular a laser diode.

In contrast to known methods, in which the measuring device may not be moved for a certain time, e.g. at least for 10 s, the measuring device 10 can be handled more simply and conveniently in the sense of the invention.

Within the scope of the invention, it is conceivable that in step 1) a plurality of measurements $x_j$ are carried out over a period of up to 5 sec, preferably 10 sec, preferably 20 sec.

The at least two different measurements $x_j$ can be carried out, for example, using electromagnetic waves, e.g. with a wavelength $\lambda$ between 800 nm and 16 μm, in particular approx. 2400 nm.

The at least two different measurements $x_j$ can further be carried out using an optical method, in particular using a spectroscopic method, preferably an absorption spectroscopic method, preferably a rovibrational spectroscopic method.

The measuring device 10 may comprise a computer unit 11 which is designed to carry out the method according to the invention, in particular to carry out the optimizations in the sense of the method according to the invention, in order to characterize the substance A.

Advantageously, the measuring device 10 may comprise a display unit 12 to illustrate the characterized spectral structure $a(\tilde{e}_i)$ whose deviation from the linear combination $$\sum_{j=1}^{M} c_j x_j$$

of the different measurements $x_j$ is minimized, and/or the determined value $\tilde{e}_i$ of the at least one property $e_i$ of the substance A. The display unit 12 may further be used to display messages such as durable, expired or the like.

Furthermore, a computer program product represents another aspect of the invention. The computer program product can be stored in a memory 15 of the measuring device 10 and, when at least partially executed in the computer unit 11 of the measuring device 10, can carry out the method according to the invention.

Advantageously, the measuring device 10 according to the invention can be used for quality control of food products of any kind, such as drinks G, preferably carbonated drinks G, to determine a pressure P and/or a carbonic acid concentration of drinks G, preferably carbonated drinks G.

The foregoing description of the figures describes the present invention exclusively in the context of examples. Of course, individual features of the embodiments can be freely combined with each other, provided it is technically reasonable, without leaving the scope of the invention.

LIST OF REFERENCE SIGNS

A substance
B container
F bottle
FK bottle head
G drink
$e_i$ properties of the substance
$e_1$ properties of the substance
$\tilde{e}_i$ property value
P pressure
P1 pressure
P2 pressure
P3 pressure
Pi pressure
N number of properties
KF characteristic field
x measurement
$x_1$ measurement
$x_2$ measurement
$x_3$ measurement
$x_j$ different measurements
M number of measurements
$a(\tilde{e}_i)$ spectral structure
$g_1 \cdot \alpha$ spectral structure
$g_2 \cdot \alpha$ spectral structure
$g_j \cdot \alpha$ quantitatively different spectral structures
s interference structure
$s_1$ interference structure
$s_2$ interference structure
$s_j$ quantitatively and/or qualitatively different interference structures
$c_j$ coefficients $$\sum_{j=1}^{M} c_j x_j$$

linear combination of the different measurements
K number of used singular vectors
$d_h$ coefficients
$u_h$ singular vectors $$\sum_{h=1}^{K} d_h u_h$$

linear combination of the singular vectors
X measurement data matrix
Q number of spectral channels
SVD singular value decomposition
V vector space
$V_x$ subspace
W waves
$\lambda$ wavelength
10 measuring device
11 computer unit
12 display unit
13 sending element
14 receiving element
15 memory

The invention claimed is:

1. A method for contactless characterization of a substance using waves,
wherein the substance comprises a spectral structure as a characteristic field which qualitatively depends on at least one property of the substance,
wherein the spectral structure is recorded by a plurality of measurements, and
wherein the plurality of measurements comprise interference structures that depend on the measurement circumstances,
wherein
in step 1), at least two different measurements of the plurality of measurements are carried out under different measurement circumstances, which have at least quantitatively or qualitatively different interference structures or quantitatively different spectral structures, and that in step 2), coefficients of a linear combination of the different measurements and the value of the at least one property of the substance are optimized so that a deviation between the linear combination and the spectral structure is minimized.

2. The method according to claim 1, wherein the at least two different measurements are carried out at at least different measurement angles or positions with respect to the substance.

3. The method according to claim 1,
wherein
the at least two different measurements are carried out at least different measurement angles or positions with respect to a bottle head of a bottle including a carbonated drink, wherein the substance forms a content of the bottle head of the bottle above the carbonated drink in the bottle.

4. The method according to claim 1,
wherein
in step 1), each measurement of the plurality of measurements are carried out under different measurement circumstances.

5. The method according to claim 1,
wherein
in step 1), the plurality of measurements are carried out over a period of up to 5 sec.

6. The method according to claim 1,
wherein
in step 1), the at least two different measurements are carried out using electromagnetic waves having a wavelength between 800 nm and 16 μm.

7. The method according to claim 1,
wherein
in step 1), the at least two different measurements are carried out using an optical method.

8. The method according to claim 1,
wherein
in step 1), the at least two different measurements are carried out using a spectroscopic method.

9. The method according to claim 1,
wherein
in step 1), the at least two different measurements are carried out using a laser measuring device.

10. The method according to claim 1,
wherein
in step 1), the at least two different measurements are carried out using a laser diode.

11. The method according to claim 1,
wherein
in step 2), for optimizing the coefficients of a linear combination of the different measurements, coefficients of a linear combination of singular vectors are optimized,
wherein the singular vectors are columns of a singular matrix,
wherein the singular matrix results from a singular value decomposition of a measurement data matrix,
and wherein the measurement data matrix comprises the different measurements in the columns.

12. The method according to claim 1,
wherein
in a step 3), the spectral structure, whose deviation from the linear combination of the different measurements is minimized, is used to determine the value of the at least one property of the substance.

13. The method according to claim 12,
wherein
in a step 4), the characteristic field for the spectral structure is updated using the spectral structure whose deviation from the linear combination of the different measurements is minimized.

14. The method according to claim 1, wherein
in a step 3), the spectral structure, whose deviation from the linear combination of the different measurements is minimized, is used to determine the value of the at least one property of the substance,
wherein the value of the at least one property of the substance forms at least a pressure or a carbonic acid concentration of a carbonated drink.

15. The method according to claim 14, wherein
in a step 4), the characteristic field for the spectral structure is updated using the spectral structure whose deviation from the linear combination of the different measurements is minimized.

16. A measuring device for contactless characterization of a substance using waves, wherein the measuring device comprises:
a sending element for sending the waves, a receiving element for receiving the waves, and a measurement path therebetween where the substance is positioned, wherein the receiving element is configured to generate a plurality of measurements under different measurement circumstances of a spectral structure as a characteristic field which qualitatively depends on at least one property of the substance
and interference structures that depend on the measurement circumstances; and
a computer unit which is designed to optimize the coefficients of a linear combination of the different measurements and the value of the at least one property of the substance in order to minimize a deviation between the linear combination and the spectral structure.

17. The measuring device according to claim 16,
wherein
the computer unit is designed to optimize the coefficients of the linear combination of the different measurements by optimizing coefficients of a linear combination of singular vectors,
wherein the singular vectors are columns of a singular matrix,
wherein the singular matrix results from a singular value decomposition of a measurement data matrix,
and wherein the measurement data matrix comprises the different measurements in the columns.

18. The measuring device according to claim 16,
wherein
the measuring device comprises a display unit which is designed to display at least the spectral structure whose deviation from the linear combination of the different measurements is minimized for the determined value of the at least one property of the substance.

19. A computer program product which can be stored in a memory of a measuring device, wherein the measuring device is for contactless characterization of a substance using waves, wherein the measuring device is designed for carrying out a method for contactless characterization of a substance using waves, wherein the substance comprises a spectral structure as a characteristic field which qualitatively depends on at least one property of the substance, wherein the spectral structure is recorded by a plurality of measurements, and wherein the plurality of measurements comprise interference structures that depend on the measurement circumstances, wherein in step 1), at least two different measurements of the plurality of measurements are carried out under different measurement circumstances, which have at least quantitatively or qualitatively different interference structures or quantitatively different spectral structures, and that in step 2), coefficients of a linear combination of the different measurements and the value of the at least one property of the substance are optimized so that a deviation between the linear combination and the spectral structure is minimized-, and which computer program product, when at least partially executed in a computer unit of the measuring device, carries out a method for contactless characterization of a substance using waves, wherein the substance comprises a spectral structure as a characteristic field which qualitatively depends on at least one property of the substance, wherein the spectral structure is recorded by a plurality of measurements, and wherein the plurality of measurements comprise interference structures that depend on the measurement circumstances, wherein in step 1), at least two different measurements of the plurality of measurements are carried out under different measurement circumstances, which have at least quantitatively or qualitatively different interference structures or quantitatively different spectral structures, and that in step 2), coefficients of a linear combination of the different measurements and the value of the at least one property of the substance are optimized so that a deviation between the linear combination and the spectral structure is minimized.

20. A use of a measuring device for quality control of drinks, to determine at least a pressure or a carbonic acid concentration of drinks, wherein the measuring device is for contactless characterization of a substance using waves, wherein the measuring device is designed for carrying out a method for contactless characterization of a substance using waves, wherein the substance comprises a spectral structure as a characteristic field which qualitatively depends on at least one property of the substance, wherein the spectral structure is recorded by a plurality of measurements, and wherein the plurality of measurements comprise interference structures that depend on the measurement circumstances, wherein in step 1), at least two different measurements of the plurality of measurements are carried out under different measurement circumstances, which have at least quantitatively or qualitatively different interference structures or quantitatively different spectral structures, and that in step 2), coefficients of a linear combination of the different measurements and the value of the at least one property of the substance are optimized so that a deviation between the linear combination and the spectral structure is minimized.

* * * * *